G. N. TURES.
Manufacture of Gravel Brick.

No. 223,018.   Patented Dec. 30, 1879.

223,018. MANUFACTURE OF GRAVEL BRICKS. George N. Tures, Lincoln Township, Dickinson County, Kans. Filed Nov. 6, 1879.

*Claim.*—The artificial stone or brick composed of gravel, hydraulic cement, and plaster-of-paris, in the proportions and molded into blocks substantially as and for the purpose described.

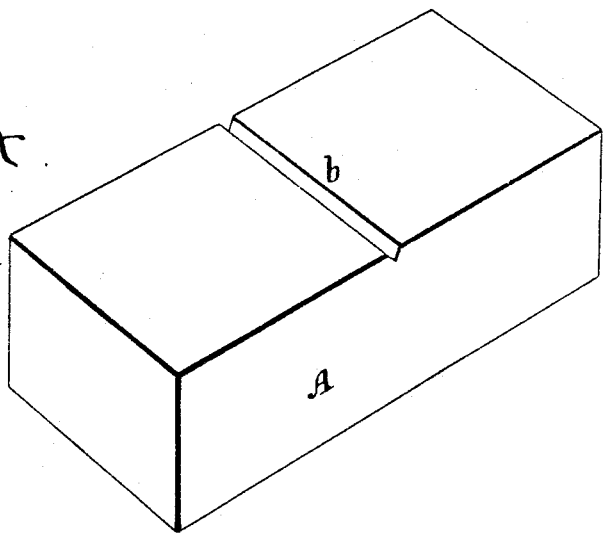

Witnesses:
H. A. Daniels.
G. B. Towles

Inventor:
George Nelson Tures
By W. Burris
Attorney

UNITED STATES PATENT OFFICE.

GEORGE N. TURES, OF LINCOLN TOWNSHIP, DICKINSON COUNTY, KANSAS.

IMPROVEMENT IN MANUFACTURE OF GRAVEL BRICKS.

Specification forming part of Letters Patent No. 223,018, dated December 30, 1879; application filed November 6, 1879.

*To all whom it may concern:*

Be it known that I, GEORGE NELSON TURES, of Lincoln township, in the county of Dickinson and State of Kansas, have invented certain new and useful Improvements in the Manufacture of Gravel Bricks and Gravel Blocks; and I do hereby declare that the following is a full, clear, and exact description of the invention, which will enable others skilled in the art to which it appertains to make and use the same, reference being had to the accompanying drawing, and to letters of reference marked thereon, which forms a part of this specification.

My invention relates to a composition for building brick or stone, consisting of gravel, water-lime, and plaster-of-paris, in the proportions, and molded into blocks of suitable size, as hereinafter fully described.

In the drawing, A is a perspective view of a double block having a crease, *b*, representing the size of the blocks as seen when built into a wall.

It is evident that these blocks may be made of any required size and shape.

The whole compound, consisting of, say, fifty-six (56) parts, is composed of about fifty-one (51) parts of gravel, three (3) parts of hydraulic cement, and two (2) parts of plaster-of-paris. These ingredients, while in a dry state, are thoroughly mixed together, and then the whole mass is saturated with water and thoroughly mixed and stirred, like common mortar is made; and when the compound is thus thoroughly mixed in a wet state it is immediately placed in suitable molds, and formed into blocks of the required size and shape, and dried in the atmosphere.

For light-colored brick the quantity of the plaster-of-paris should be about twice the quantity of the cement, and for dark-colored brick the quantity of plaster-of-paris should be only about half the quantity of the cement.

I am aware that water-lime and plaster-of-paris have been used in cements and in artificial stone with other ingredients; but I am not aware of brick or stone composed alone of the ingredients in the proportions which I use.

What I claim as new, and desire to secure by Letters Patent, is—

The artificial stone or brick composed of gravel, hydraulic cement, and plaster-of-paris, in the proportions and molded into blocks, substantially as and for the purpose described.

In testimony that I claim the foregoing as my own I affix my signature in presence of three witnesses.

GEORGE NELSON TURES.

Witnesses:
S. A. BURROUGHS,
R. C. RAYMOND,
J. H. BURRIS.